No. 612,744. Patented Oct. 18, 1898.
D. & H. H. METHVEN.
ALMOND HULLER AND SEPARATOR.
(Application filed May 1, 1897.)
(No Model.) 4 Sheets—Sheet 1.
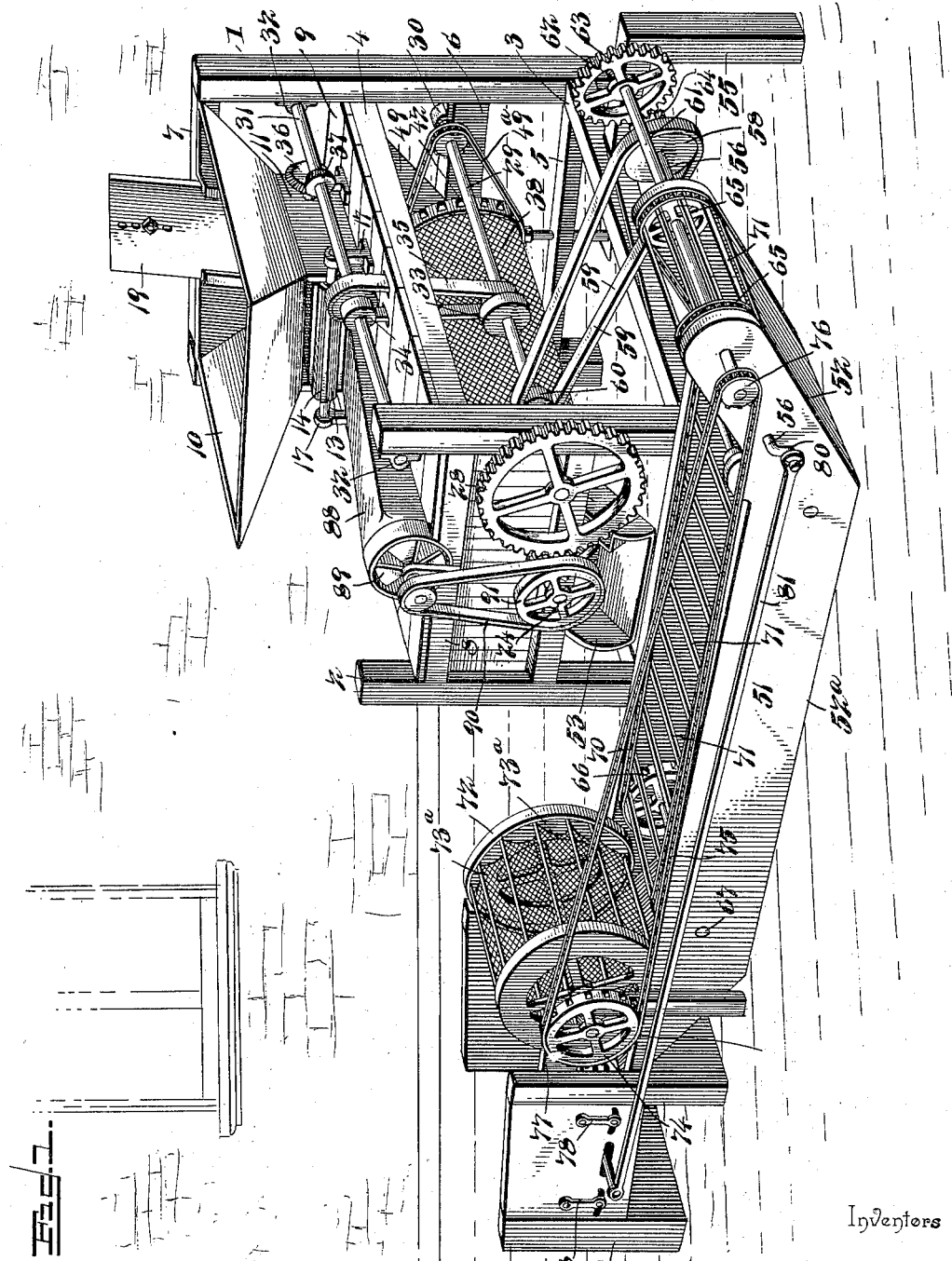
Witnesses
E. N. Stewart
Edwin Cruse
By their Attorneys,
Inventors
Daniel Methven
Harry H. Methven
C. A. Snow & Co.
THE NORRIS PETERS CO., PHOTO-LITHO., WASHINGTON, D. C.

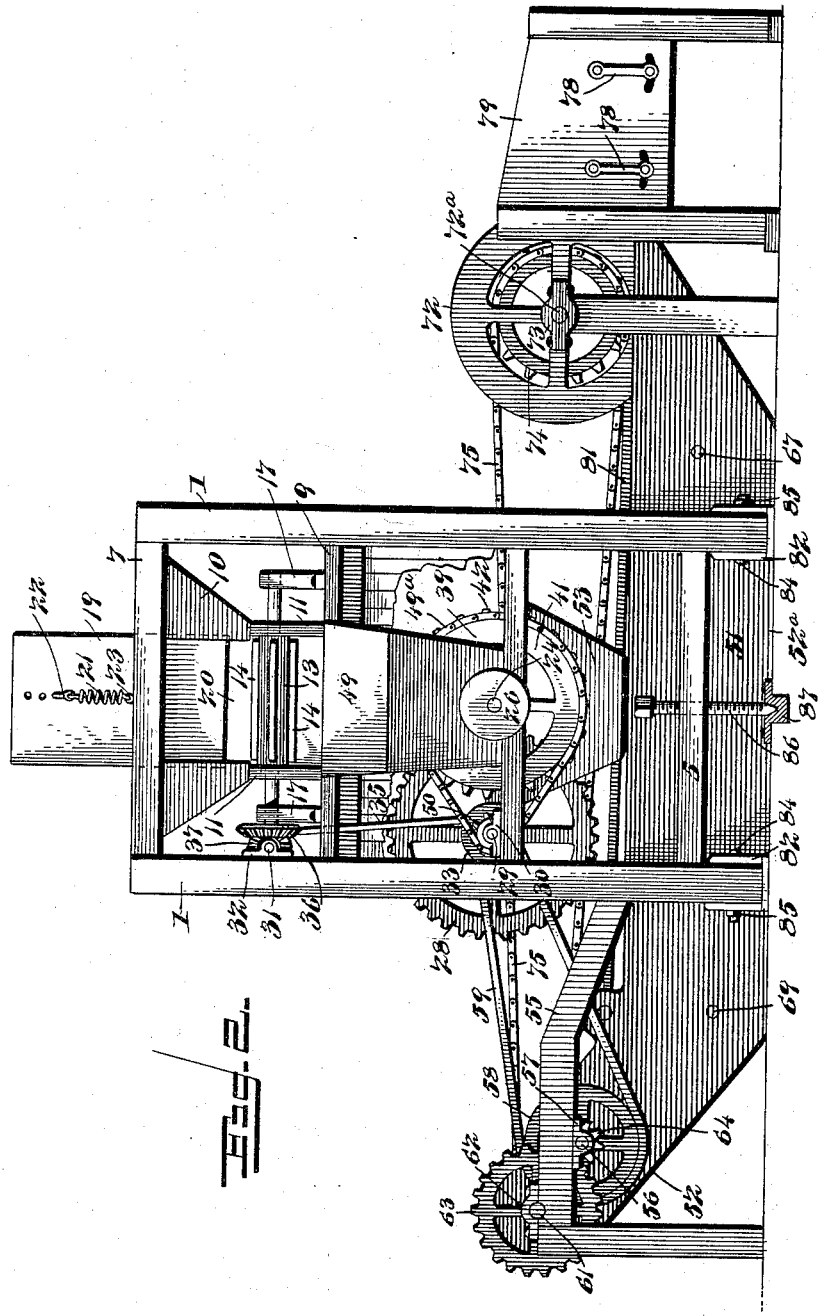

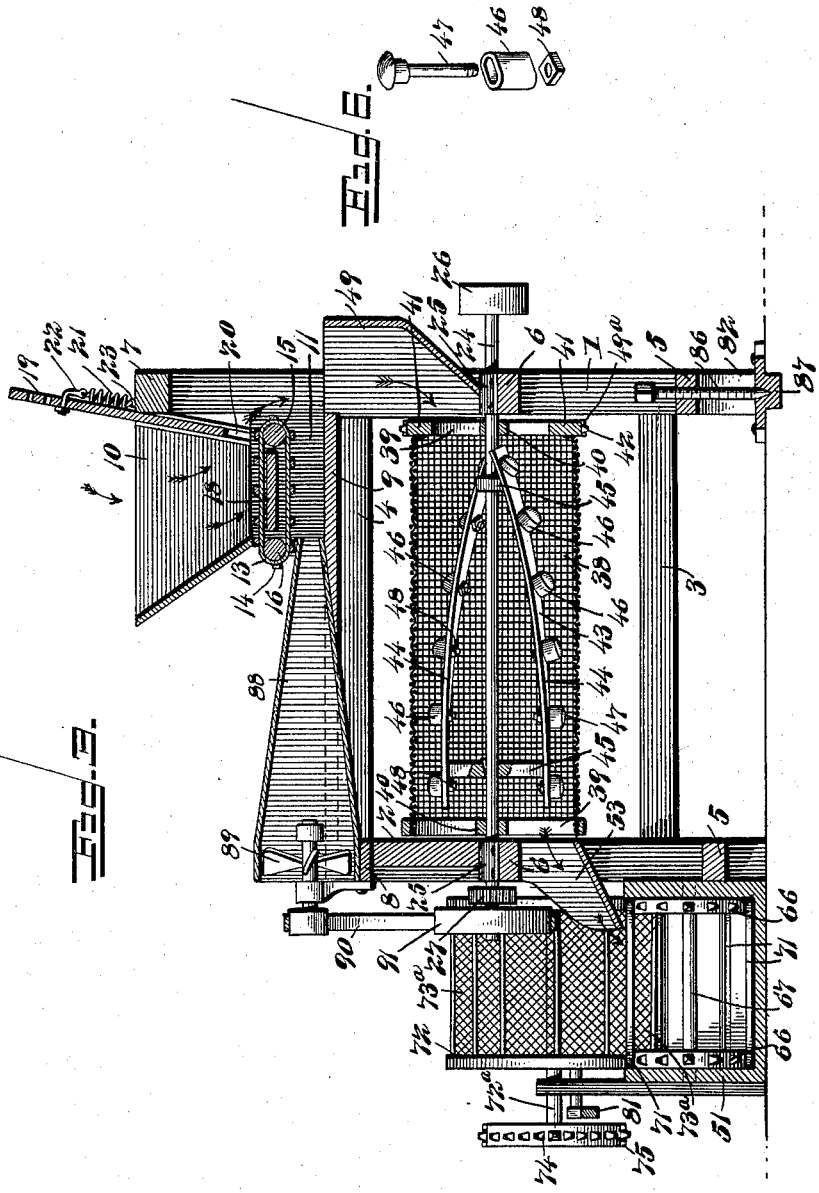

No. 612,744. Patented Oct. 18, 1898.
D. & H. H. METHVEN.
ALMOND HULLER AND SEPARATOR.
(Application filed May 1, 1897.)
(No Model.) 4 Sheets—Sheet 4.
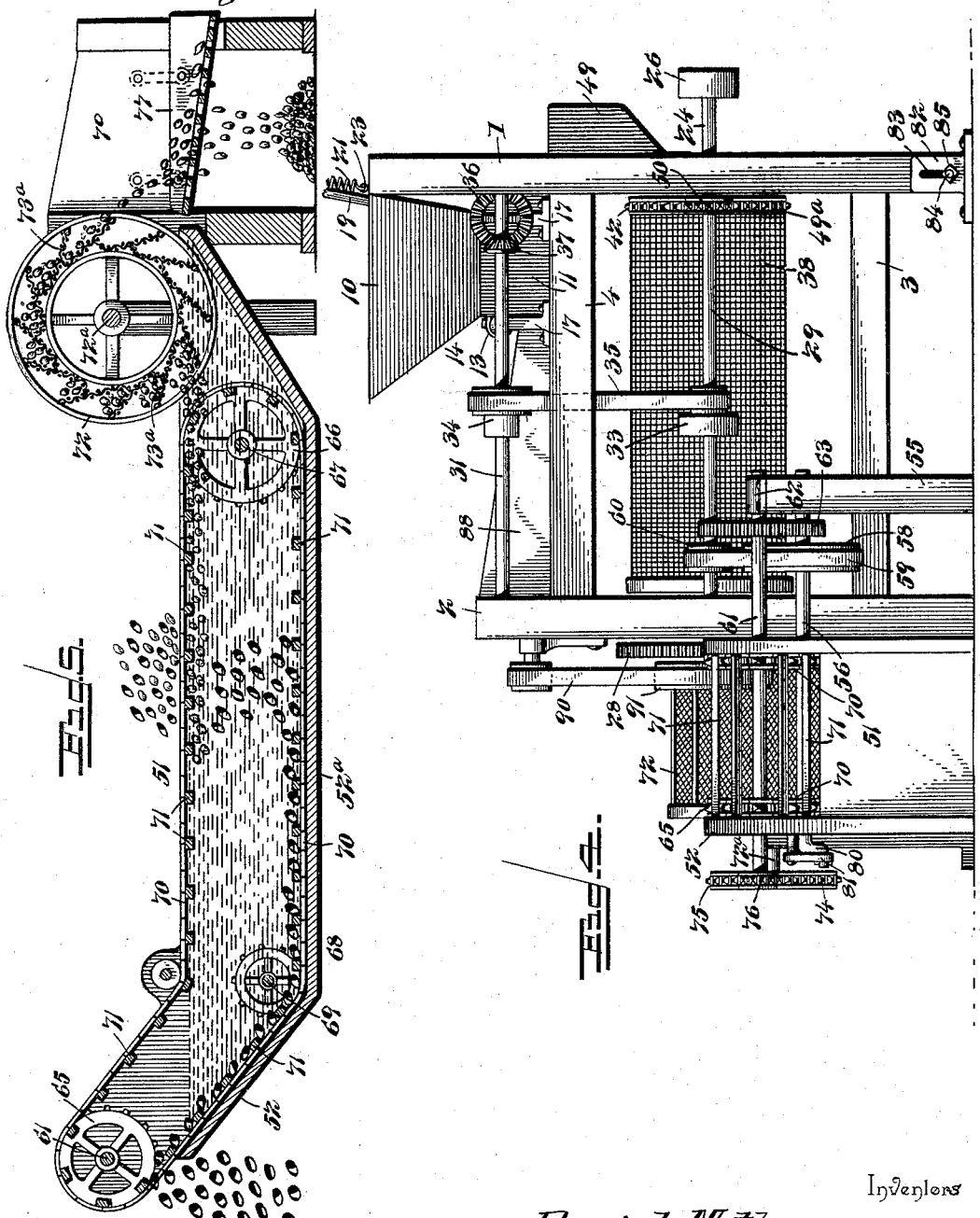
Witnesses
Inventors
Daniel Methven
Harry H. Methven
By their Attorneys,
C. A. Snow & Co.

UNITED STATES PATENT OFFICE.

DANIEL METHVEN AND HARRY H. METHVEN, OF ANTIOCH, CALIFORNIA.

ALMOND HULLER AND SEPARATOR.

SPECIFICATION forming part of Letters Patent No. 612,744, dated October 18, 1898.

Application filed May 1, 1897. Serial No. 634,753. (No model.)

*To all whom it may concern:*

Be it known that we, DANIEL METHVEN and HARRY H. METHVEN, citizens of the United States, residing at Antioch, in the county of Contra Costa and State of California, have invented a new and useful Almond Huller and Separator, of which the following is a specification.

This invention relates to machines for hulling almond-nuts and separating the hulls from the nut, its object being to provide a machine in which the nuts as they are received from the tree will be fed into a cylinder, where they will be subjected to the action of a beater, whereby the hulls will be separated from the nuts and from which cylinder the hulls and nuts will be discharged into a separating-tank containing water, in which tank the nuts will float on the surface of the water, while the hulls will sink to the bottom, and from which tank both the hulls and the nuts are removed by suitable mechanism.

The invention will be fully described hereinafter and particularly pointed out in the claims.

In the drawings, Figure 1 is a rear perspective view of the machine. Fig. 2 is a front end view of the same. Fig. 3 is a vertical longitudinal section. Fig. 4 is a side elevation. Fig. 5 is a vertical longitudinal section through the separating mechanism. Fig. 6 is a group of detached details.

Similar reference-numerals indicate similar parts in the several figures.

The frame of the machine consists of vertical front standards 1 and the rear standards 2. These standards are connected together by lower and upper longitudinal bars 3 and 4 and by lower and middle transverse bars 5 and 6. The upper ends of the standards 1 are also connected by a transverse bar 7, and the rear standards are similarly connected at their upper ends by a transverse bar 8.

9 indicates a platform or flooring which is supported by the upper longitudinal bars 4.

10 indicates a hopper into which the unhulled nuts are placed as they come from the trees. This hopper is supported at its lower end upon two planks (indicated by 11) which are arranged edgewise and supported on and secured to the platform 9.

13 indicates an endless belt which is provided with transverse slats 14. This belt serves as a moving bottom for the hopper 10 and is supported upon rollers 15 and 16, the spindles of which rollers pass through the planks 11 and are journaled in suitable bearings 17, supported on the platform 9.

18 indicates a plate which extends across between the two plies of the belt 13 and serves as a support for the upper ply of the apron. This plate 18 is supported by the planks 11. The front wall of the hopper 10 is provided with a sliding gate 19, which is adjusted to leave a discharge-opening 20 between its lower end and the upper surface of the belt 13, and this opening will be adjusted to regulate the discharge of the nuts from the hopper 10 as circumstances may require. The gate 19 is permitted to have a yielding vertical movement, which is controlled by a coiled spring 21, secured at one end to a pin 22 on the gate and at its other end to a pin 23 in the cross-bar 7 of the frame. The object of permitting this yielding movement is to prevent the choking up of the feed-aperture.

The spring 21 in its normal condition supports the sliding gate in its normal position, and the position of the gate can be adjusted by changing the point of connection between the pin 22 and the sliding gate, a series of openings $22^a$ being provided in the gate for this purpose. In this manner the size of the discharge-opening can be regulated to suit existing circumstances, and should the nuts have a tendency to become jammed in the opening the gate will yield upwardly against the force of the spring and prevent the discharge-opening from becoming choked.

The main driving-shaft is indicated by 24 and is journaled in suitable bearings 25, supported on the cross-bars 6 of the frame. This shaft projects beyond its bearings at each end and is provided at the front end of the machine with a pulley 26, by means of which it will be driven from a source of power. (Not shown.) At the rear end of the machine the shaft 24 is provided with a pinion 27, which meshes with a gear-wheel 28. This gear-wheel 28 is rigidly connected to a counter-shaft 29, which is journaled in suitable bearings 30, supported on the cross-bars 6 of the frame. 31 indicates another counter-shaft extending longitudinally of the machine and journaled in suitable bearings 32, supported on the standards 1 and 2. The shaft 29 is provided with a cone-pulley 33, and the shaft 31 is provided with a similar pulley 34, and these two pulleys are connected by a belt 35. Motion is thereby transmitted to the shaft 31 from the main shaft 24 through the medium of the pinion 27, gear 28, and pulleys 33 and 34. One of the spindles of the roller 15 projects beyond its bearing and is provided with a beveled gear 36, which meshes with a bevel-pinion 37, secured to the shaft 31, and by these means the endless belt 13 is driven in order to feed the unhulled nuts out of the hopper 10.

The hulling device consists of a cylinder 38, made of heavy wire-netting and provided at each end with a spider or wheel 39, the hubs 40 of which are loosely mounted upon the main shaft 24 in order that the cylinder may turn freely thereon. The end of the cylinder adjacent to the front of the machine, and which is the receiving end, is provided with an inwardly-extending flange 41, which is designed to prevent the escape of the nuts from this end of the cylinder after they are discharged into it. This flange is rigidly secured to the spider or wheel, and its outer periphery extends beyond the outer periphery of the cylinder and is provided with a series of sprocket-teeth 42, by means of which the cylinder will be rotated, as will be described hereinafter.

43 indicates a beater arranged within the cylinder 38. This beater consists of a series of spirally-arranged bars 44, supported at their opposite ends upon the ends of spokes 45, which spokes are rigidly secured to the main shaft 24. Each bar 44 is provided with a series of teeth 46, which teeth project to within about one inch of the interior surface of the cylinder 38. Preferably these teeth 46 will be made of ordinary half-inch iron gas-pipe and will be about three inches in length. The pipe will be pressed to bring it into substantially elliptical form in cross-section. The teeth will be fastened to the bars 44 by means of ordinary carriage-bolts 47, which will pass through the teeth lengthwise and through openings in the bars 44 and be secured in place by nuts 48, screwing on the ends of the bolts and engaging the under surface of the bars 44. By this arrangement if the nuts are loosened the elliptical teeth may be adjusted at any desired angle to the bars 44 to suit the different kinds of nuts to be hulled. The form of the teeth, together with the spiral arrangement of the bars 44, will when the machine is in operation carry the nuts from the receiving end of the cylinder 38 to its discharge end.

49 indicates a chute supported on the frame in any desired manner and arranged in such position that the belt 13 will discharge the nuts from the hopper 10 into the chute and the latter will in turn convey them into the cylinder 38.

The beater 43 will be driven at a comparatively high rate of speed in one direction and the cylinder 38 will be driven in a reverse direction to that in which the beater moves at a comparatively slow speed by means of a sprocket-chain 49ª, which works over the toothed rim 41 on the receiving end of the cylinder and over a small sprocket-wheel 50, rigidly mounted on the counter-shaft 29. The cylinder 38 will extend almost the entire length of the machine between the vertical standards 1 and 2 and works below the platform 9.

51 indicates a tank, which may be either of wood or metal and the ends 52 of which incline outwardly and upwardly from the bottom 52ª. This tank is designed to be filled with water and is arranged at the rear end of the machine to receive the hulled nuts and the hulls as they are discharged from the hulling-cylinder 38, a chute 53 being supported on the frame of the machine, down which the hulled nuts pass from the cylinder into the tank. The tank extends longitudinally across the machine and the nuts are discharged into it near one of its ends.

55 indicates a framework on which are supported the bearings for the shafts which drive the mechanism employed in removing the hulled nuts and the hulls.

56 indicates a shaft which is journaled in suitable bearings 57, supported on the frame 55, and this shaft carries a pulley 58, which is driven by a belt 59 from a pulley 60 on the shaft 29. 61 indicates another shaft, which is journaled in bearings 62, supported on the frame 55, and this shaft carries a gear-wheel 63, which meshes with a pinion 64 on the shaft 56. It will thus be seen that the shafts 56 and 61 are driven from the shaft 29. The shaft 61 carries a pair of sprocket-wheels 65, which are spaced apart a distance somewhat less than the width of the interior of the tank 51.

66 indicates a pair of sprocket-wheels mounted on a shaft 67. The shaft 67 is supported in the sides of the tank, and the sprocket-wheels 66 are arranged in close proximity to the inner faces of the sides of the tank and are of a diameter substantially equal to the depth of the tank.

68 represents another pair of sprocket-wheels mounted upon a shaft 69, which is supported in the sides of the tank. The sprocket-wheels 68 are arranged within the tank at the angle formed by the bottom 52ª and the inclined end 52, adjacent to where the nuts and hulls are received from the hulling-cylinder. A pair of endless sprocket-chains 70 run around the sprocket-wheels 65, 68, and 66, and these chains carry a series of slats 71. The bottom ply of this slat belt runs in close proximity to the bottom of the tank and one of its inclined ends, while the upper ply runs along at the surface of the water in the tank.

72 indicates a bucket-wheel, the shaft 72ª of which is journaled in suitable bearings 73, supported by the tank 51. The buckets 73ª of this wheel are formed of wire-netting and are adapted in the lower part of their travel to extend below the surface of the water within the tank 51. The water-wheel works in close proximity to the sprocket-wheels 66.

74 indicates a sprocket-wheel which is rigidly secured to the shaft 72ª, and this sprocket-wheel is connected by a sprocket-chain 75 with a small sprocket-wheel 76 on the end of the shaft 61. The bucket-wheel is therefore driven by the shaft 61.

77 indicates a shoe which is suspended by links 78 from a frame 79. This shoe is arranged close to the bucket-wheel 72 and receives the nuts which the bucket-wheel lifts out of the tank. The shoe 77 is given a vibratory movement by means of a rod 81, which connects it with a crank 80 on the end of the shaft 56.

82 indicates a pair of shoes which are firmly secured to the floor or other foundation on which the machine-frame is supported. These shoes receive the lower ends of the vertical standards 1, and their opposite vertical sides are provided with elongated slots 83, and bolts 84 pass transversely through the standards 1 and the slots 83 in the shoes. These bolts are provided with nuts 85, by means of which the standards can be clamped within the shoes.

86 represents a set-screw working in the bottom cross-rail 5, which connects the vertical standards 1, and the lower end of this screw engages a plate 87, secured to the floor. By loosening the nuts 85 on the bolts 84 and by turning the screw 86 the front end of the machine may be elevated, when desired, in order to give the cylinder 38 a slight downward inclination toward its rear end to facilitate the passage of the nuts through it.

The operation of the machine is as follows: The nuts as they are received from the tree are dumped into the hopper 10, from which they are uniformly fed by the endless slat belt 13 through the opening at the lower end of the sliding gate 19. The nuts as they are carried through this opening will fall into the chute 49 and be discharged into the front end of the cylinder 38. As the cylinder 38 is revolved in one direction, while the beater 43 within it is revolved in the opposite direction, the nuts will be constantly turned over by the cylinder as they are being acted upon by the beaters. In their passage through the cylinder the hulls will be taken off the nuts, and the hulled nuts and the hulls will be discharged out of the rear end of the cylinder 38 into the chute 53, from which they will pass into the tank 51. The hulls will sink to the bottom of the tank, but the nuts from which the hulls have been removed and also any nuts which may have passed through the cylinder 38 without having the hulls removed from them will float on the top of the water. The slatted belt 70 71 as it travels over its supporting sprocket-wheels will carry the nuts toward the bucket-wheel 72, and the buckets of the wheel will gather up the nuts and discharge them onto the shoe 77. This shoe by its vibratory motion will separate the hulled nuts from the unhulled ones, and the hulled nuts will pass through the meshes in the shoe, while the unhulled nuts will be discharged from its open rear end. As the slatted belt 70 71 moves along over the bottom 52ª of the tank and up the inclined end 52 it will carry the hulls with it and discharge them out of the end of the tank, as will be readily understood.

On the top of the platform 9 is supported a fan-casing 88, which is provided at its receiving end with a fan 89, which is driven by means of a belt 90 from a pulley 91 on the end of the main driving-shaft 24. The discharge end of the fan is below the endless slatted belt 13, and the nuts as they pass from the hopper 10 to the chute 49 are subjected to a current of air from the fan, which will carry away any rubbish that may be mixed with the nuts.

It will be understood that changes in the form, proportion, and minor details of construction may be resorted to without departing from the spirit or sacrificing any of the advantages of this invention.

What we claim is—

1. In a machine for hulling nuts, the combination of a hopper having a discharge-opening in one side, a traveling feeder forming the bottom of the hopper and operating through the discharge-opening thereof, a vertically-movable gate for controlling the said discharge-opening arranged with its lower edge over the said feeder, and a spring for holding the gate open at a given distance and permitting it to move vertically when there is a tendency of the nuts to wedge between its lower edge and the feeder, substantially as described.

2. In a machine for hulling nuts, the combination of a hopper having a discharge-opening in one side, an endless feeder forming the bottom of the hopper and operating through the discharge-opening thereof, a vertically-sliding gate for regulating the size of the said discharge-opening and located above the endless feeder, and a spring having adjustable connection with the gate for holding it open the required distance and permitting it to automatically rise when the nuts tend to wedge between the lower edge of the gate and the feeder, substantially as set forth.

3. In a machine for hulling nuts, the combination with feeding mechanism, of a cylinder formed of wire-netting and loosely mounted on a shaft, a beater rigidly connected to said shaft within the cylinder, said beater consisting of a series of flat spiral bars, arranged with their flat faces parallel to the cylinder, and a series of teeth on the outer face of each bar, means to rotate said shaft in one direction, and means to rotate the cylinder in the opposite direction, substantially as described.

4. A nut-hulling device comprising a perforated cylinder, and a beater supported to rotate within the cylinder, said beater consisting of a series of spirally-arranged bars, and a series of teeth secured to the bars and axially adjustable thereon, said teeth being elliptical in cross-section, substantially as described.

5. A nut-hulling device comprising a perforated cylinder the receiving end of which is provided with an inwardly-projecting annular flange, and a beater consisting of a series of spirally-arranged bars, a series of hollow teeth elliptical in cross-section, and bolts to adjustably secure said teeth to the bars, substantially as described.

6. In a machine for hulling nuts, the combination with the feeding and hulling mechanism, of a tank into which the hulled nuts and the hulls are discharged, a liquid in the tank to separate the hulls from the nuts, means to remove the nuts from the surface of the liquid, and means to remove the hulls from the bottom of the tank, substantially as described.

7. In a machine for hulling nuts, the combination with the feeding and hulling mechanism, of a separating-tank containing a liquid into which the nuts and hulls are discharged from the hulling mechanism and on which liquid the nuts float and through which liquid the hulls sink to the bottom of the tank, the ends of said tank being inclined upwardly and outwardly from its bottom, an endless slat belt moving over the bottom and one inclined end of the tank and over the surface of the liquid, a bucket-wheel supported at the end of the tank adjacent to the end of the travel of the slatted belt, substantially as and for the purpose specified.

8. In a machine for hulling nuts, the combination with feeding and hulling mechanisms, of a separating-tank which receives the hulled nuts and the hulls, a liquid within the tank on which the nuts float and through which the hulls sink to the bottom of the tank, a bucket-wheel supported to revolve at one end of the tank to elevate the floating nuts from the liquid, a shoe supported adjacent to said wheel to receive the nuts therefrom, an endless belt moving over the surface of the liquid to carry the nuts to the wheel, and means to rotate the wheel and vibrate the shoe, substantially as described.

In testimony that we claim the foregoing as our own we have hereto affixed our signatures in the presence of two witnesses.

DANIEL METHVEN.
HARRY H. METHVEN.

Witnesses:
W. H. WEEKS,
F. M. WILLS.